(12) United States Patent
Gu et al.

(10) Patent No.: US 9,423,298 B2
(45) Date of Patent: Aug. 23, 2016

(54) HIGH ENERGY LASER TARGET BOARD APPARATUS

(71) Applicant: Teledyne Scientific & Imaging, LLC, Thousand Oaks, CA (US)

(72) Inventors: Dong-Feng Gu, Thousand Oaks, CA (US); Bruce Winker, Ventura, CA (US); Ya-Chi Chen, Simi Valley, CA (US); Milind Mahajan, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 162 days.

(21) Appl. No.: 14/463,436

(22) Filed: Aug. 19, 2014

(65) Prior Publication Data

US 2016/0054176 A1   Feb. 25, 2016

(51) Int. Cl.
*G01J 1/42* (2006.01)
*G01J 1/04* (2006.01)

(52) U.S. Cl.
CPC ............ *G01J 1/4257* (2013.01); *G01J 1/0425* (2013.01); *G01J 1/0437* (2013.01); *G01J 1/0474* (2013.01)

(58) Field of Classification Search
None
See application file for complete search history.

(56) References Cited

U.S. PATENT DOCUMENTS

| | | | |
|---|---|---|---|
| 3,344,703 A | 10/1967 | Milton | |
| 3,705,999 A * | 12/1972 | Herziger | H01S 3/0305 313/30 |
| 3,746,454 A * | 7/1973 | Pace | G01J 1/04 250/208.2 |
| 3,892,468 A * | 7/1975 | Duguay | G02B 6/2861 250/227.11 |
| 4,260,251 A * | 4/1981 | Conrad | H01S 3/0014 356/121 |
| 4,260,255 A | 4/1981 | Wachs et al. | |
| 4,321,824 A * | 3/1982 | Martin | F41J 5/02 250/349 |
| 4,797,555 A * | 1/1989 | La Mar | G01J 1/4257 250/336.1 |
| 4,828,384 A * | 5/1989 | Plankenhorn | G01J 1/02 356/121 |
| 5,841,125 A | 11/1998 | Livingston | |
| 7,760,334 B1 | 7/2010 | Evans | |
| 7,952,691 B2 | 5/2011 | Mosier et al. | |
| 8,203,109 B2 | 6/2012 | Taylor et al. | |
| 2010/0110439 A1 | 5/2010 | Gruler et al. | |
| 2012/0002193 A1 | 1/2012 | Elliott et al. | |
| 2012/0148188 A1* | 6/2012 | Silny | G01J 1/0425 385/24 |

FOREIGN PATENT DOCUMENTS

WO    2010/138226    2/2010

OTHER PUBLICATIONS

Luke, James R. et al., "High Energy Laser Diagnostic Sensors", The Aegis Technologies Group, Albuquerque, New Mexico, 8 pages.

* cited by examiner

*Primary Examiner* — Gordon J Stock, Jr.
(74) *Attorney, Agent, or Firm* — Snell & Wilmer LLP

(57) ABSTRACT

A laser target board apparatus is provided for detecting spatial and temporal intensity distribution of high energy laser beams. The laser target board apparatus may include a panel having a plurality of openings and a plurality of optical rods placed therein. The laser target board apparatus may further have an optic fiber array positioned substantially parallel to and behind the panel and separated from the panel by a predetermined distance. At least one lens is configured to receive photons emitted from a second end of each optic fiber unit of the optic fiber array, and at least one camera is configured to detect the photons. A processor is configured to analyze temporal and spatial distribution of intensity of the received high energy laser beam based on data generated by the at least one camera.

20 Claims, 7 Drawing Sheets

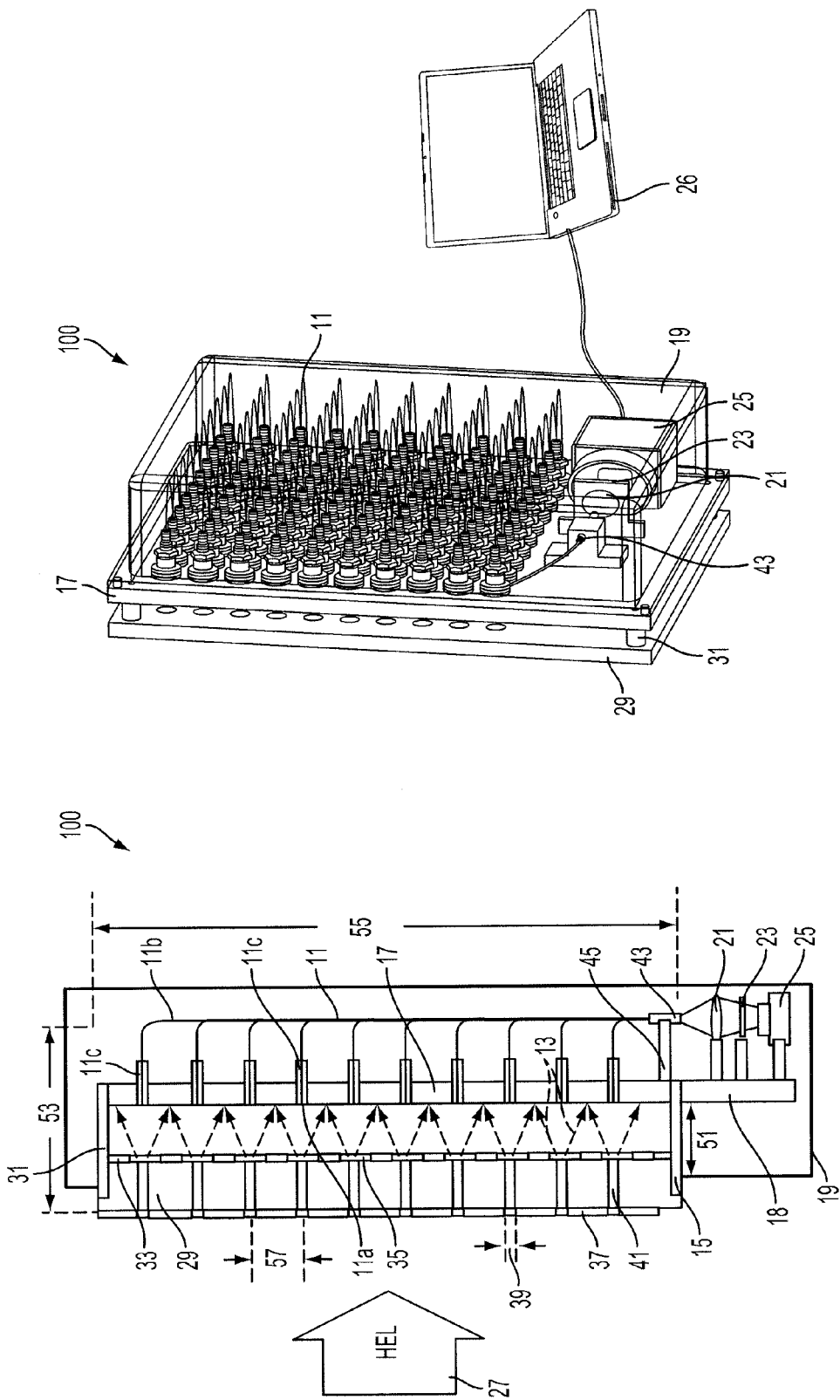

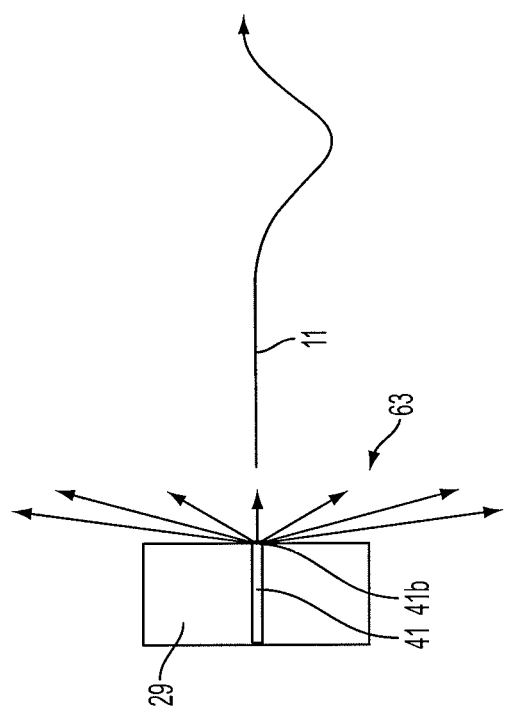
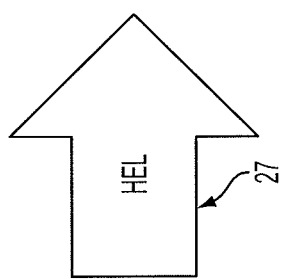
FIG. 3

HIGH ENERGY LASER TARGET BOARD APPARATUS

BACKGROUND

1. Field

The present disclosure relates to methods and systems for detecting and analyzing high energy laser beams.

2. Description of the Related Art

High Energy Laser (HEL) devices have been increasingly utilized in various applications. HEL weapons have been developed for destroying or burning a given target. HEL weapons have been increasingly utilized in moving military platforms (e.g., aircrafts, ships, trucks and unmanned aerial vehicle (UAV) or drones) to destroy targets such as missiles. However, development of HEL devices has outpaced the development of HEL detector/sensor technology. Therefore, there is a need in the art to determine temporal and spatial intensity of an HEL beam irradiating a target surface. Furthermore, there is a need in the art to determine temporal and spatial intensity in free space laser communication systems and optical power beaming systems.

Indirect measurements of HEL irradiance (such as thermal sensors or remote optical/thermal imaging) have proven to be inaccurate and unreliable. Photo detector arrays in direct path of HEL beams cannot withstand the high intensity of HEL beams. Direct measurement has not been available for HEL irradiance on a moving target. Because a target is subject to an extremely high temperature when exposed to HEL beams, the industry has not focused on development of target apparatuses under direct exposure to HEL beams.

As such, there is a need in the art for measuring spatial and temporal HEL irradiance at multi-kW power levels or higher levels in an outdoor environment. For HEL weapons utilized in moving military platforms, it is desirable for measurement system to be light-weight and robust to flight aerodynamics. There is also a need in the art for a low-cost intensity measurement system with reusability, ease of retrofit, simplicity in calibration, and scalability.

SUMMARY

The present invention is a laser target board apparatus for detecting spatial and temporal intensity distribution of high energy laser (HEL) beams. In one embodiment, the laser target board apparatus is a laser weapon target apparatus for detecting spatial and temporal intensity distribution of HEL beams of an HEL weapon. In one embodiment, the laser target board apparatus includes a panel having a plurality of openings and a plurality of optical rods placed therein. The panel is made of an energy barrier material capable of remaining mechanically intact at a temperature of at least 1,500 degrees Celsius when irradiated by an HEL beam. The optical rods are configured to allow photons of the received HEL beam to be emitted through the optical rods. The laser target board apparatus may further include an optional porous layer positioned substantially parallel to, adjacent and behind the panel. The optional porous layer has openings centrally aligned with the optical rods. The openings of the optional porous layer may be wider than a corresponding and adjacent optical rod of the optical rods.

The laser target board apparatus may further include an optic fiber array positioned substantially parallel to and behind the panel and separated from the panel by a predetermined distance. The optic fiber array includes a plurality of rows of optic fiber units and a plurality of columns of optic fiber units. Each optic fiber unit has a tip portion for receiving photons from the optical rods and a propagation portion. The propagation portion may have a first end connected to the tip portion and a second end. Each optic fiber unit is configured to transmit a received photon from the first end of each optic fiber unit to the second end of each optic fiber unit. At least one lens is configured to receive photons emitted from the second end of each optic fiber unit of the optic fiber array. At least one camera may be configured to detect the photons emitted from the optic fiber detector array and passed through the at least one lens.

In one embodiment, the energy barrier material of the laser target board apparatus is graphite, and the optical rods are made of sapphire. The laser target board apparatus may further include an optical filter positioned between the at least one lens and the at least one camera. The optical filter may be a neutral density filter. In one embodiment, the optical filter is configured to be switched on or off, for use with different light intensities of received HEL beams.

In one embodiment, the laser target board apparatus also includes an optical diffuse reflector positioned parallel to, adjacent and on top of the panel. The optical diffuse reflector includes a plurality of openings centrally aligned with the optical rods. The panel receives the HEL beam after the HEL beam passes through the optical diffuse reflector. In another embodiment, the optical diffuse reflector is not utilized and the HEL beam is directly emitted onto the panel.

The optic fiber array of the laser target board apparatus may include greater than or equal to 5 rows of optic fiber units and less than or equal to 100 rows of optic fiber units, and may further include greater than or equal to 5 columns of optic fiber units and less than or equal to 100 columns of optic fiber units. In one embodiment, each optical rod may have a frosted end positioned proximal to a corresponding adjacent opening of the optional porous layer for Lambertian scattering on the frosted end and uniform optic distribution to a corresponding optic fiber unit of the optic fiber array. In a preferred embodiment, each optic fiber unit 11 of the optic fiber array is registered to a single corresponding optical rod to significantly reduce or eliminate cross-talk between adjacent optic fiber units 11. As a result, accuracy of intensity measurement is enhanced. In one embodiment, a numerical aperture cone angle of the tip portion of the each optic fiber unit covers only photons directly emitted by the single corresponding optical rod. The second ends of the optic fiber units may be bundled or joined together at a contact located proximal to the focal plane of at least one lens.

A unique advantage of the invention is that both spatial and temporal intensity can be directly and accurately measured. For example, the laser target board apparatus may further include a processor configured to be connected to the at least one camera and configured to analyze temporal and spatial distribution of intensity of the received HEL beam based on data generated by the at least one camera based on the detected photons.

An advantage of the invention is that significantly high optical power handling capabilities are achieved by using an absorber as the barrier and probing directly small part of the photons in the beam that channels though the barrier. Because a significant percentage of the energy of the HEL beam is converted into heat and/or broadband or other forms of irradiance, the high energy photons do not damage the sensing elements. As such, the laser target board apparatus can withstand HEL beams up to a high laser damage threshold.

Furthermore, the laser target board apparatus is reusable and made of low-cost components. Also, the laser target board apparatus provides flexibility in design, has a scalable modular architecture, and can be calibrated and installed easily. In addition, the laser target board apparatus is light-weight and low-power, ideal for aircraft applications and airborne targeting practices for HEL weapons. Yet another unique advantage of the laser target board apparatus is that the accuracy of measurement is not impacted by test environment and flight aerodynamics.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

FIG. 1 is a cross-sectional schematic view of a laser target board apparatus for detecting spatial and temporal intensity distribution of high energy laser (HEL) beams according to certain embodiments of the present invention;

FIG. 2 is a perspective view of a laser target board apparatus for detecting spatial and temporal intensity distribution of HEL beams according to certain embodiments of the present invention;

FIG. 3 is a cross-sectional schematic view of a panel and an optical rod, shown in isolation, to illustrate the spatial filter effect and semi-sphere scattering from the optical rod according to certain embodiments of the present invention;

DETAILED DESCRIPTION

Figure 4:
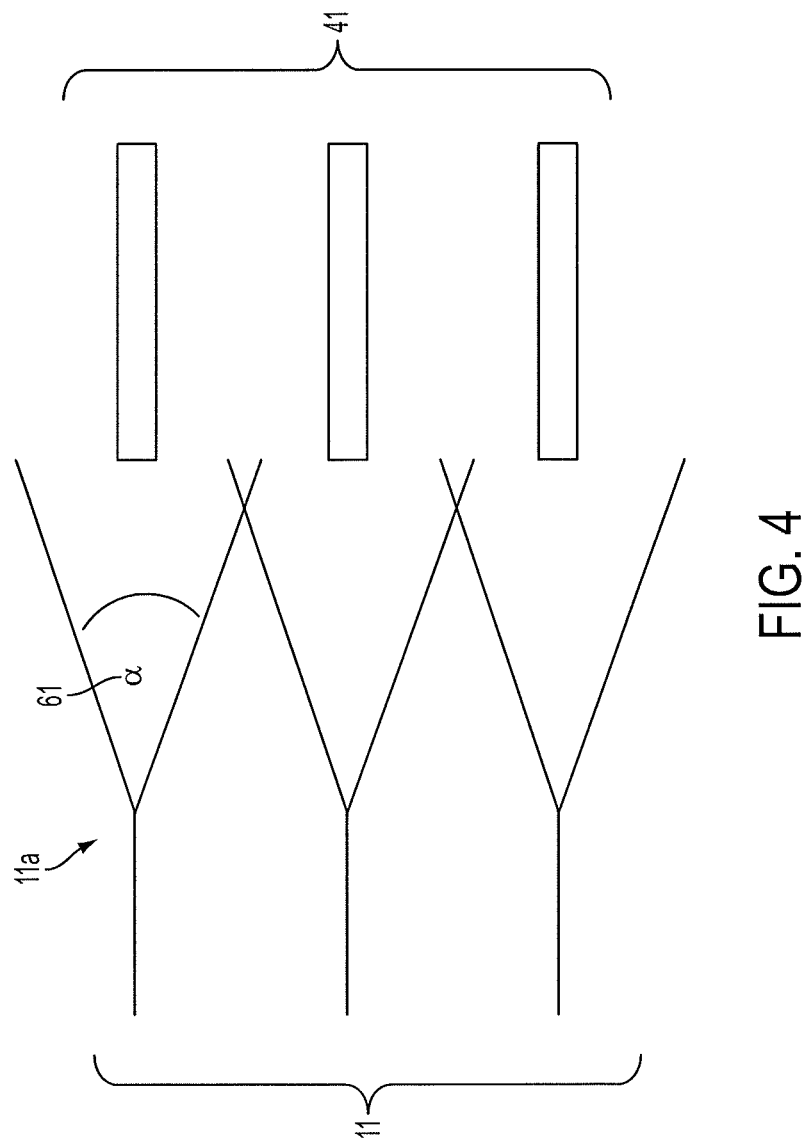
FIG. 4 is a cross-sectional schematic view of numerical aperture cone angles for tip portions of an optic fiber array utilized in a laser target board apparatus according to certain embodiments of the present invention.

Apparatus, systems and methods that implement the implementation of the various features of the present disclosure will now be described with reference to the drawings. The drawings and the associated descriptions are provided to illustrate some implementations of the present disclosure and not to limit the scope of the present disclosure. Throughout the drawings, reference numbers are re-used to indicate correspondence between reference elements. In addition, the first digit of each reference number generally indicates the figure in which the element first appears.

FIG. 1 is a cross-sectional view of a laser target board apparatus 100 for detecting spatial and temporal intensity distribution of high energy laser (HEL) beams according to certain embodiments of the present invention. FIG. 2 is a perspective view of the laser target board apparatus 100 shown in FIG. 1, according to certain embodiments of the present invention. The laser target board apparatus 100 detects and analyzes special and temporal distribution of intensity of HEL beams, and other characteristics of HEL laser beams as needed. The laser target board apparatus may be formed as a target board to receive an HEL beam 27. Although rectangular boards are shown, the elements of the laser target board apparatus may be formed in other shapes based on design concerns without limiting the scope of the present invention.

The apparatus may utilize an optional optical diffuse reflector 37. The optical diffuse reflector 37 has a plurality of openings 39. The optical diffuse reflector 37 receives the HEL beam 27 and partially reflects the HEL beam 27. In certain embodiments, the plurality of openings 39 are within the range of 1 to 3 millimeters (mm). In an embodiment, the plurality of openings 39 are about 2 mm wide. For example, the HEL beam 27 may have a diameter in the range of 1 centimeter (cm) to 10 cm. For example, the HEL beam 27 may have a diameter of 4 cm. The optical diffuse reflector 37 is optional. For example, in other embodiments, HEL may be directly emitted onto the panel 29.

The panel 29 has a plurality of openings in which a plurality of optical rods 41 are positioned. The panel 29 is made of an energy barrier material capable of remaining mechanically intact at a temperature of at least 1,500 degrees Celsius when receiving a HEL beam. In one embodiment, the energy barrier material is capable of remaining mechanically intact at a temperature of at least 2,000 degrees. An "energy barrier" as used herein refers to a material or element that is capable of receiving an HEL beam, remain mechanically intact under a high temperature, and convert the energy of the HEL beam into heat, broadband radiation (such as infrared radiation), and/or other form of irradiance. For example, the panel 29 may convert the HEL beam energy into heat energy and/or irradiate infrared beams into the semi-sphere of the surrounding space.

As evident from the exemplary components and materials described herein, a unique advantage of the invention is that the laser target board apparatus 100 can be calibrated and installed easily. Furthermore, the laser target board apparatus 100 is reusable and has a scalable modular architecture. In addition, the laser target board apparatus 100 is advantageously made of light-weight and low-power, which is ideal for aircraft applications and airborne targets. Yet another unique advantage of the laser target board apparatus 100 is that it is made of low cost components.

In a preferred embodiment, the panel 29 is made of a material with high thermal conductivity, high melting point, and/or superior back-body emissivity. The panel 29 is also ideally made of low-cost material and is relatively easy to machine. In a preferred embodiment, the panel 29 is made of a graphite material. Graphite can withstand temperatures of at least 2,000 degrees Celsius. Graphite may oxidize under such temperatures, but remains mechanically intact. The panel 29 is configured to convert the received high optical energy to heat and/or broadband radiation (such as infrared radiation). In certain embodiments, less than 1 percent (1%) of the energy channels through the optical rods 41. This stage of attenuation, along with subsequent stages of power attenuation, advantageously allows direct, accurate, and reliable measurement of the HEL beam 27.

The plurality of optical rods 41 are configured to allow photons of the received HEL beam 27 to be emitted through the plurality of optical rods 41. In one embodiment, the optical rods 41 are made of a sapphire material. The optical rods 41 may be positioned on the same plane in rows and columns.

A unique advantage of the present invention is that there is flexibility in design. For example, the number of optic fiber units 11 and optical rods 41 may be modified depending on desired spatial intensity detection. For example, the optical rods 41 in the range of 5×5 to 100×100 may be utilized depending on design concerns such as the desired precision in 2-dimensional spatial intensity detection.

An optional porous layer 33 is positioned substantially parallel to, adjacent and behind the panel 29. The optional porous layer 33 has a plurality of openings 35 centrally aligned with the plurality of optical rods 41. In one embodiment, the plurality of openings 35 of the optional porous layer 33 are wider than a corresponding and adjacent optical rod 41. This allows photons 13 to be emitted onto the array of optic fiber units 11, as shown in FIG. 1. In one embodiment, the optional porous layer 33 can made of nickel and is used for mounting graphite panel 29 that has embedded optical rods 41.

Referring to FIG. 1, in one embodiment, each optical rod 41 has a frosted exit end 41b positioned proximal to a corresponding adjacent opening 35 of the optional porous layer 33. FIG. 3 shows the panel 29 and the optical rod 41 in isolation to illustrate spatial filter effect and semi-sphere scattering 63 from the frosted exit end 41b of the optical rod 41. Referring to FIG. 3, the frosted exit end 41b allows Lambertian scattering and uniform optic distribution to a corresponding optic fiber unit 11. This significantly attenuates the amount of photons that reach the array of optic fiber units 11 and propagates along the particular fiber that is registered to the corresponding optical rod 41. This attenuation is predetermined such that the photons that reach the array of optic fiber units 11 accurately reflect the properties of the HEL beam 27. In one embodiment, only about $10^{-7}$ of the irradiance can enter the optic fiber unit 11.

Referring back to FIGS. 1 and 2, an array of optic fiber units 11 may be positioned behind the panel 29 and separated from the panel 29 by a predetermined distance 51. The distance 51 can be predetermined based on design parameters such as the amount of attenuation desired, spatial resolution desired, and the level of cross-talk allowed between adjacent fibers. Generally, the longer the distance 51, the higher the attenuation because the solid angle of the exit end 41b with respect to the particular sensing fiber decreases with the increase of distance 51. However, the distance 51 cannot be too large so that the neighboring optical rods 41 are in the numerical aperture of the optic fiber unit 11 operating as a sensor, resulting in cross-talk because the photons emitted from the neighboring optical rods 41 would enter the particular optic fiber unit 11. This aspect is further described below with respect to FIG. 4. As a result, the distance 51 can be predetermined based on design parameters such as the degree of attenuation desired in this stage. Attenuation stages are discussed in further details below with respect to FIG. 5.

Referring to FIGS. 1 and 2, a mechanical mount 15 may be optionally utilized to structurally retain the panel 29 and a metal panel 17. The metal panel 17 may have a plurality of openings in which the optic fiber units 11 are positioned. In one embodiment, the length 55 of the metal panel 17 is within the range of 100-1,000 mm. In one embodiment, the metal panel 17 is made of a nickel material to provide mechanical/dimensional stability at elevated temperatures.

The array of optic fiber units 11 includes a plurality of rows of optic fiber units and a plurality of columns of optic fiber units. Each optic fiber unit 11 has a polished tip portion 11a for receiving photons from the plurality of optical rods 41. Each optic fiber unit 11 has a propagation portion 11b having a first end as the tip portion 11a and a second end. In one embodiment, the tip portion 11a can be mounted with a ceramic ferrule 11c for the ease of installation and polishing. In one embodiment, the propagation portion 11b can be connected to the tip portion 11a and the ceramic ferrule 11c with a fiber connector. Each optic fiber unit 11 is configured to transmit a received photon from the first end of the each optic fiber unit 11 to the second end of each optic fiber unit. The second ends of the optic fiber units 11 may be bundled or joined together at a contact 43 retained by the mechanical mount 45 and located proximal to the focal plane of at least one lens 21. The bundled or joined sections are polished so that they are flush at the contact 43.

The plurality of optic fiber units 11 may be positioned on the same plane in rows and columns. For example, the optic fiber units 11 in the range of 5×5 to 100×100 may be utilized depending on design parameters such as the desired precision in 2-dimensional spatial intensity detection. The optic fiber units 11 may be positioned at equal distances 57 from one another. In one embodiment, the distance 57 is less than or equal to 10 mm.

In a preferred embodiment, each optic fiber unit 11 is registered to a single corresponding optical rod 41 to suppress or eliminate cross-talk between the adjacent optic fiber units 11. The one-to-one relationship is illustrated in FIG. 4.

FIG. 4 shows numerical aperture cone angle ($\alpha$) for tip portions 11a of the array of optic fiber units 11. The numerical aperture serves as an additional layer of attenuation because it substantially reduces the percentage of photons that can enter each optic fiber unit 11. However, the attenuation is predetermined such that the camera 25 can accurately detect temporal and spatial intensity of the HEL beam. Alpha ($\alpha$) is predetermined to receive mostly or solely photons directly emitted from the corresponding optical rod 41.

At least one lens 21 is configured to receive photons emitted from the second end of each optic fiber unit 11 of the optic fiber array. At least one camera 25 is configured to detect the photons emitted from the array of optic fiber units 11 and passed through the at least one lens 21 as shown in FIG. 1. The at least one camera 25 may include an infrared camera. In one embodiment, the camera has a dynamic range of $10^4$.

A unique advantage of the present invention, as shown by exemplary simulated results above, is that the sensing elements are scalable and modular. For example, the laser target board apparatus 100 depicted in FIG. 1 can be composed of four graphite panels 29 each with 5×5 optical rods. The fiber mounting panel can be constructed in a similar fashion. This modular architecture provides the ease and flexibility for device calibration, repair, scale-up, and data analysis. Furthermore, in one embodiment, invariant sensing fiber to imager pixel registration provides favorable calibration and accuracy.

At least one filter 23 may be optionally positioned between the at least one lens 21 and the at least one camera 25. In one embodiment, the optical filter 23 is a neutral density filter. In certain embodiments, the optical filter 23 is configured to be switched on or off, for use with different irradiance levels of received HEL beams. For example, the optical filter 23 may be configured to manually or automatically pop in or out of place (for example, using a solenoid). For example, when detecting an HEL beam 27, the optical filter 23 may be positioned in place, and when detecting lower energy beams, the optical filter 23 may be popped out of place such that no filter is between the optical path between the lens 21 and the camera 25. For example, an Optical Density (OD3) pop-in neutral density filter can be used to attenuate high intensity laser beams, but switched off when the device is dealing with low intensity laser beams such as tracking laser beams before the target is shot with a HEL beam. The placement of the filter in or out of position can be controlled electronically. As a result, the dynamic range of the laser target board apparatus is increased by a factor of $10^3$. Intentional defocusing can attenuate pixel saturation by a factor of greater than 10, and the dynamic range of the sensing system thus can be greater than $10^8$.

In one embodiment, a single lens 21, a single filter 23, and a single camera 25 are utilized. In other embodiments, more than one lens 21, more than one filter 23, and/or more than one camera 25 may be utilized. For example, the additional lens 21, the filter 23, and/or the camera 25 may cover different spatial areas of the laser target board apparatus 100. A hermetic seal 19 may cover at least the optic fiber units 11, the at least one lens 21, and the at least one camera 25.

A processor 26 may be provided that is configured to be connected to the at least one camera 25. The connection may be wired or wireless over a network. The processor 26 may be any processor configured to analyze temporal and spatial distribution of intensity of the received HEL beam 27 based on data generated by the at least one camera 25 based on the detected photons. The processor 26 may be, for example, a personal computer, a laptop, a portable electronic device (such as a tablet or a smart phone), or other processors without limiting the scope of the present invention. A unique advantage of the invention is that both spatial and temporal intensity can be directly and accurately measured. Yet another unique advantage of the laser target board apparatus 100 is that the accuracy of measurement is not impacted by test environment and flight aerodynamics. In one embodiment, less than 1 cm spatial resolution at 1 percent (1%) accuracy and up to 1 kHz frame rate is achieved at about 5 kW/cm² for about 5 seconds.

Figure 5:
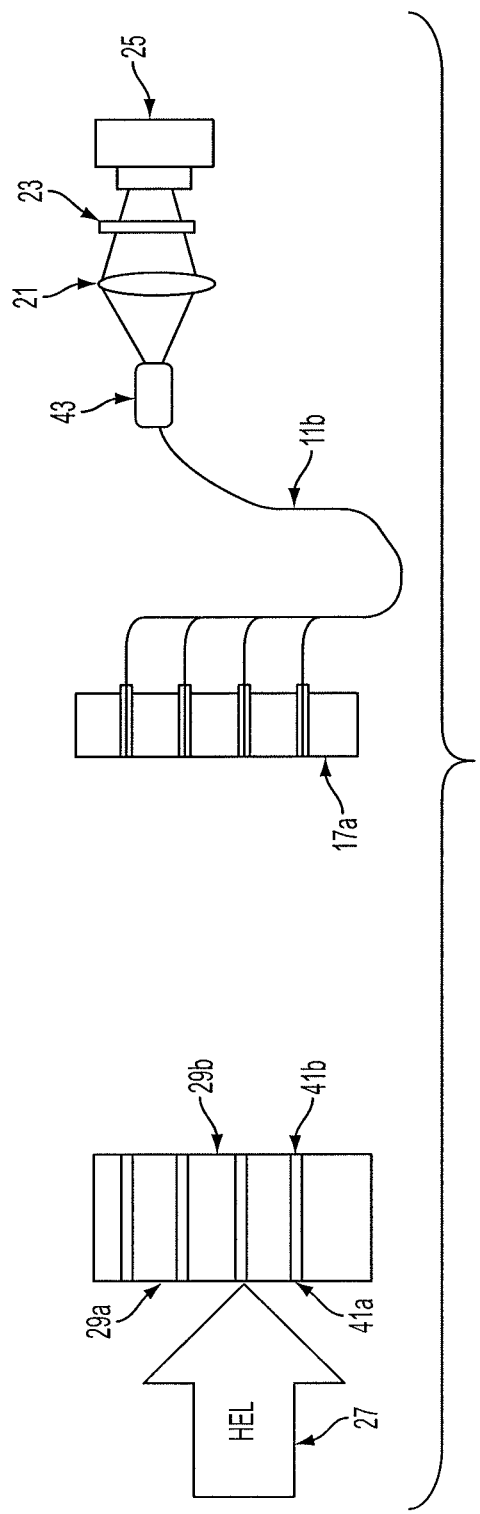
FIG. 5 is a cross-sectional schematic view of the optical power attenuation stages of a laser target board apparatus according to certain embodiments of the present invention.

FIG. 5 shows the optical power attenuation stages. Exemplary power values from simulation results at each stage of power attenuation are indicated as follows for illustrating the advantages of the invention in terms of power attenuation. The present invention is not limited to such exemplary power attenuation values. For example, the HEL beam 27 may be emitted on the entrance end 41a of the optical rod 41 and the entrance end 29a of the panel 29 at about 5,000 W/cm², at a temperature of roughly 2,000 degrees Celsius. A considerable amount of power attenuation can be achieved (e.g., $10^{-7}$ attenuation) by providing multiple layers of attenuation.

The first energy barrier and power attenuation is the combination of the panel 29 and the optical rods 41. For example, at the exit end 29b of the panel 29, power is advantageously attenuated to only 135 W/cm², at a temperature of less than 1,500 degrees Celsius. At the exit end 41b is at a temperature of less than 1,500 degrees Celsius of the optical rod 41, and power is attenuated to about 4,300 W/cm². Another stage of attenuation is adjusted based on the distance 51, as discussed above with respect to FIGS. 1 and 2. Yet another barrier and power attenuation is the ferrule mount or metal panel 17. The metal panel 17 may be made of a nickel material. The entrance end 17a of the metal panel 17 may be at less than 135 W/cm², at a temperature of less than 100 degrees Celsius. The photons in individual optic fiber units 11 are at 14 mW of power at a temperature of less than 80 degrees Celsius. Simulation results for an exemplary embodiment as set forth above showed that the laser target board apparatus 100 can provide an accuracy of greater than 1 percent (1%), a dynamic range of $10^4$, less than 0.1% of crosstalk/noise between the optic fiber units 11, and an irradiance range of 0.1 to about or greater than 5 kW/cm².

In simulation of performance of the laser target board apparatus 100, a 20-by-20 cm panel 29 was utilized, embedding optical rods 41. Each optical rod 41 was separated by an adjacent optical rod 41 by 1 cm of center-to-center spacing. The optical rods 41 had 2 mm diameters and 1-2 cm thickness. The simulation was carried out after the laser target board apparatus 100 was heated in a 1,000 degree Celsius furnace. In simulation of performance of the laser target board apparatus 100, the following thermal properties were determined. The panel 29 had a density of 2,160 kg/m3, specific heat of 710 J/kgK, and thermal conductivity of 500 W/mK. The optical rod 41 had a density of 3,980 kg/m3, specific heat of 700 J/kgK, and thermal conductivity of 33.5 W/mK. Heat dissipated through all surfaces by radiation and natural convection. The surface emissivity was 1, and heat transfer coefficient was 20 W/m²K. The ambient temperature of testing was 25 degrees Celsius. The present invention is not limited to the foregoing exemplary dimensions and characteristics, as they can be modified based on design concerns.

A unique advantage of the present invention, as shown by exemplary simulated results above, is that the apparatus is configured to absorb irradiance and significantly attenuate power in multiple stages. A significant portion of the energy of the HEL beam 27 is converted into heat and/or mostly long wave infrared radiation, thereby enhancing safety of measurement. An advantage of the present invention is that significantly high optical power handling capability is achieved by using an absorber as the barrier and probing small part of the photons in the beam that channels though the barrier. The laser target board apparatus 100 can withstand HEL beams up to a high laser damage threshold, which may be greater than 5 kw/cm.

Figure 6:
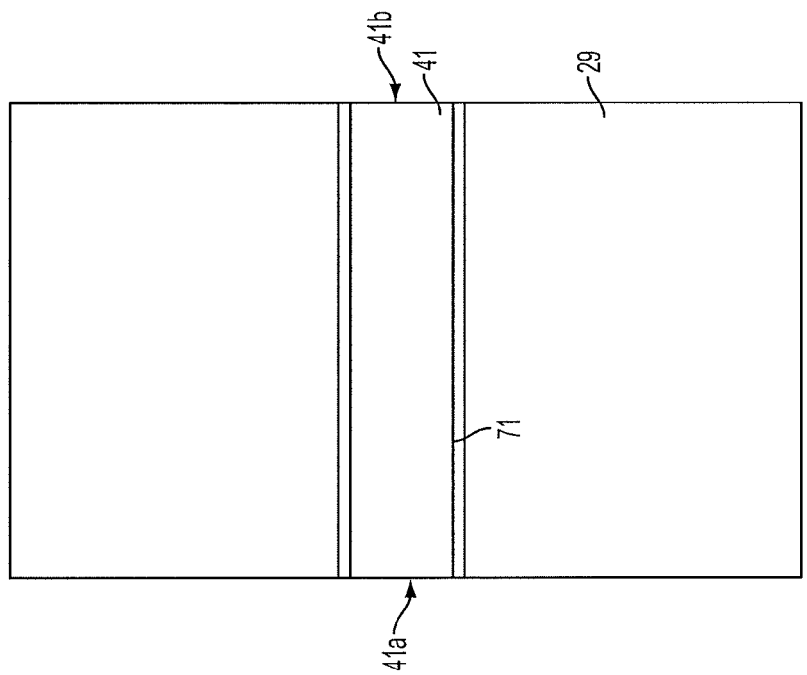
FIG. 6 is a cross-sectional schematic view of a coating applied between an optical rod and a panel of a laser target board apparatus according to certain embodiments of the present invention.

FIG. 6 shows a coating 71 applied between the optical rod 41 and the panel 29. In one embodiment, the coating 71 is a reflective coating such that it acts as a mirror. The photons can propagate from the entrance end 41a to the optical rod's exit end 41b of the optical rod 41, without substantially entering or "leaking" into the panel 29. In effect, leakage to the panel 29 is successfully suppressed. As a result, the angular dependence of the measurement is reduced.

Figure 7:
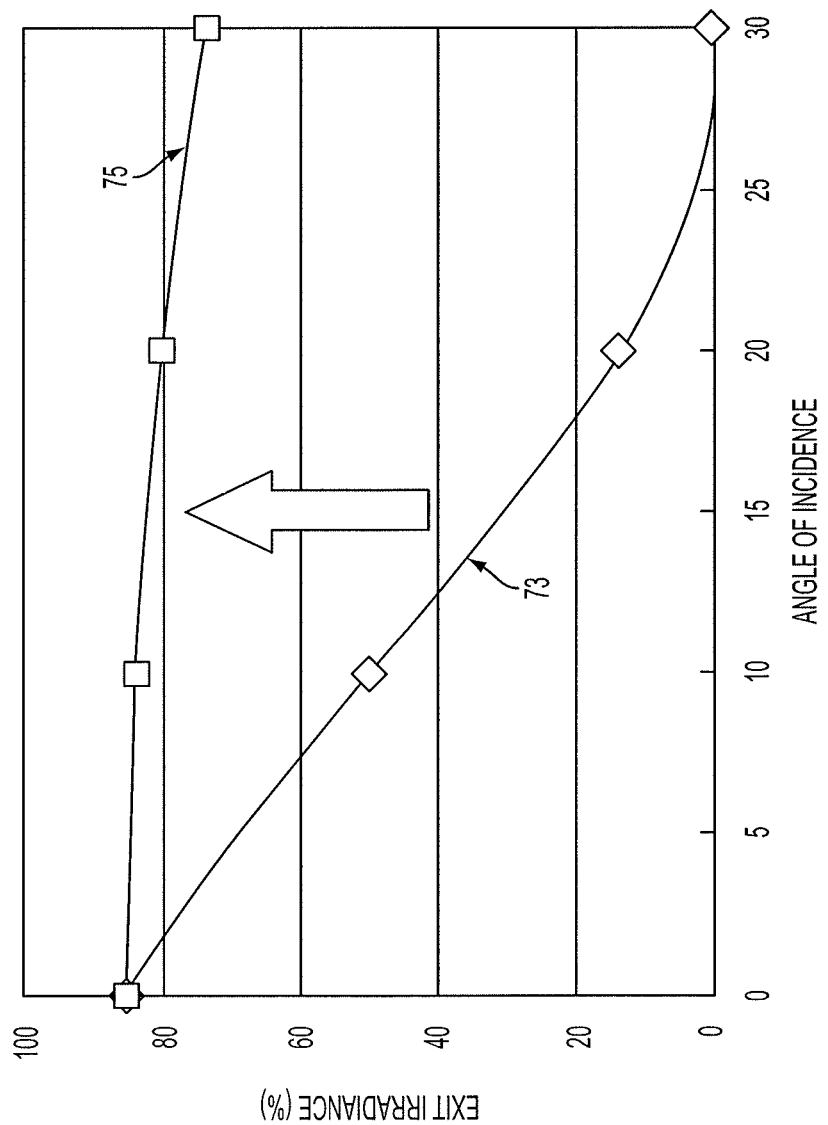
FIG. 7 is a graph plotting exit radiance as a function of angle of incidence for an embodiment without mirror coating and an embodiment with mirror coating according to certain embodiments of the present invention.

FIG. 7 is a graph comparing exit radiance as a function of angle of incidence between an embodiment 73 without mirror coating and an embodiment 75 with mirror coating 71. As can be seen in FIG. 7, appropriate mirror coating 71 can be applied to reduce leakage into the panel 29. As a result, the exit irradiance percentage from the frosted exit end 41b of the optical rod 41 is significantly less dependent on the angle of incidence of photons. In another embodiment, instead of or in addition to mirror coating 71, the sidewalls of the optical rod 41 can be polished so that very small amounts of photons can enter the exit end 41b of the optical rod 41.

Figure 8:
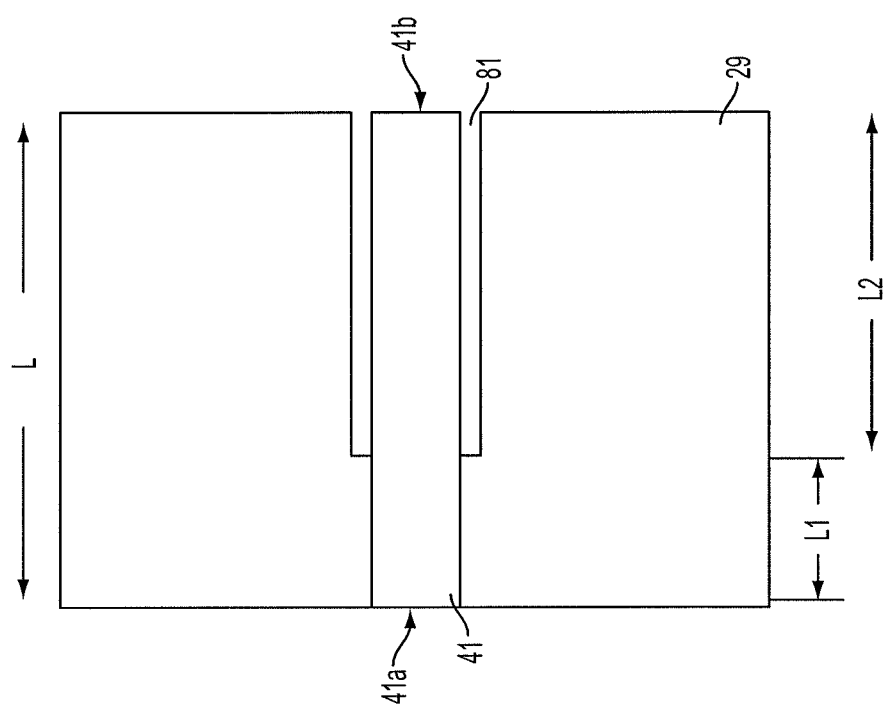
FIG. 8 is a cross-sectional schematic view of a laser target board apparatus in which spacing is provided between optical rods and a panel according to certain embodiments of the present invention.

FIG. 8 shows another embodiment in which a similar effect as the mirror coating may be achieved by providing an empty space 81 between the panel 29 and the optical rod 41. In one embodiment, the panel 29 and the optical rod 41 have a length L, and the empty space 81 extends over a sub-length L2 between the panel 29 and the optical rod 41. In certain embodiments, empty space 81 acts as a mirror coating due to the high refractive index of the optical rod 41 (which may be made of a sapphire material) and low refractive index of air. The empty space 81 allows the photons to more easily propagate to the exit end 41b. No coating or empty space 81 is provided over sub-length L1. In the L1 length, photons are able to leak into the panel 29. The leakage increases dependence on angle of incidence. L1 and L2 provide design flexibility in order to predetermine the degree of leakage and dependence on the angle of incidence. If L1 is significantly smaller than L, then similar results as shown in embodiment 75 of FIG. 7 can be achieved because leakage would not be significant. In another embodiment, the embodiment in FIG. 8 can be modified such that the mirror coating 71 of FIG. 6 is placed over sub-length L2 of FIG. 8 instead of the empty space 81 to achieve a similar effect.

Exemplary implementations of the disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such implementations that reasonably fall within the scope of the advancement to the art hereby contributed, and that that scope shall not be restricted, except in light of the appended claims and their equivalents.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device, point of sale device, personal digital assistant (e.g., an Android device, iPhone®, Blackberry®), cellular phone, kiosk, etc., online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

What is claimed is:

1. A laser target board apparatus for detecting spatial and temporal intensity distribution of high energy laser beams, comprising:
    a panel having a plurality of openings and a plurality of optical rods placed therein, the panel being made of an energy barrier material capable of remaining mechanically intact at a temperature of at least 1,500 degrees Celsius when receiving a high energy laser beam, the plurality of optical rods configured to allow photons of the received high energy laser beam to be emitted through the plurality of optical rods;
    an optic fiber array positioned substantially parallel to and behind the panel and separated from the panel by a predetermined distance, the optic fiber array including a plurality of rows of optic fiber units and a plurality of columns of optic fiber units, each optic fiber unit having a tip portion for receiving photons from the plurality of optical rods and a propagation portion having a first end connected to the tip portion and a second end, each optic fiber unit configured to transmit a received photon at the tip portion from the first end of the propagation portion to the second end of the propagation portion;
    at least one lens configured to receive photons emitted from the second end of the propagation portion of each optic fiber unit of the optic fiber array; and
    at least one camera configured to detect the photons emitted from the optic fiber array and passed through the at least one lens.

2. The laser target board apparatus of claim 1, further comprising an optical diffuse reflector positioned parallel to, adjacent and on top of the panel, the optical diffuse reflector including a plurality of openings centrally aligned with the plurality of optical rods, the panel receiving the high energy laser beam after the high energy laser beam passes through the optical diffuse reflector; and
    a porous layer positioned substantially parallel to, adjacent and behind the panel, the porous layer having a plurality of openings centrally aligned with the plurality of optical rods, wherein the plurality of openings of the porous layer are wider than a corresponding and adjacent optical rod of the plurality of optical rods.

3. The laser target board apparatus of claim 1, wherein the energy barrier material is graphite.

4. The laser target board apparatus of claim 1, wherein the plurality of optical rods are made of sapphire.

5. The laser target board apparatus of claim 1, wherein the optic fiber array includes greater than or equal to 5 rows of optic fiber units and less than or equal to 100 rows of optic fiber units, and further includes greater than or equal to 5 columns of optic fiber units and less than or equal to 100 columns of optic fiber units.

6. The laser target board apparatus of claim 1, further comprising an optical filter positioned between the at least one lens and the at least one camera.

7. The laser target board apparatus of claim 6, wherein the optical filter is a neutral density filter.

8. The laser target board apparatus of claim 6, wherein the optical filter is configured to be switched on or off, for use with different light intensities of received high energy laser beams.

9. The laser target board apparatus of claim 1, wherein the second ends of the plurality of rows of optic fiber units and the plurality of columns of optic fiber units are bundled or joined together at a contact located proximal to the focal plane of the at least one lens.

10. The laser target board apparatus of claim 1, wherein each optic fiber unit of the optic fiber array is registered to a single corresponding optical rod of the plurality of optical rods.

11. The laser target board apparatus of claim 10, a numerical aperture cone angle of the tip portion of the each optic fiber unit of the optic fiber array covers only photons directly emitted by the single corresponding optical rod of the plurality of optical rods.

12. The laser target board apparatus of claim 1, wherein each optical rod of the plurality of optical rods has a frosted end for Lambertian scattering on the frosted end and uniform optic distribution to a corresponding optic fiber unit of the optic fiber array.

13. The laser target board apparatus of claim 1, further comprising a hermetic seal covering at least the optic fiber array, the at least one lens, and the at least one camera.

14. The laser target board apparatus of claim 1, further comprising a processor configured to be connected to the at least one camera and configured to analyze temporal and spatial distribution of intensity of the received high energy laser beam based on data generated by the at least one camera based on the detected photons.

15. A laser weapon target board apparatus for detecting spatial and temporal intensity distribution of high energy laser beams, comprising:
- a panel having a plurality of openings and a plurality of optical rods placed therein, the panel being made of an energy barrier material capable of remaining mechanically intact at a temperature of at least 1,500 degrees Celsius when receiving a high energy laser beam, the plurality of optical rods configured to allow photons of the received high energy laser beam to be emitted through the plurality of optical rods;
- an optic fiber array positioned substantially parallel to and behind the panel and separated from the panel by a predetermined distance, the optic fiber array including a plurality of rows of optic fiber units and a plurality of columns of optic fiber units, each optic fiber unit having a tip portion for receiving photons from the plurality of optical rods and a propagation portion having a first end connected to the tip portion and a second end, each optic fiber unit configured to transmit a received photon at the tip portion from the first end of the propagation portion to the second end of the propagation portion;
- at least one lens configured to receive photons emitted from the second end of the propagation portion of each optic fiber unit of the optic fiber array;
- at least one camera configured to detect the photons emitted from the optic fiber array and passed through the at least one lens; and
- an optical filter positioned between the at least one lens and the at least one camera.

16. The laser weapon target board apparatus of claim 15, wherein each optic fiber unit of the optic fiber array is registered to a single corresponding optical rod of the plurality of optical rods, and a numerical aperture cone angle of the tip portion of the each optic fiber unit of the optic fiber array covers only photons directly emitted by the single corresponding optical rod of the plurality of optical rods.

17. The laser weapon target board apparatus of claim 15, further comprising a processor configured to be connected to the at least one camera and configured to analyze temporal and spatial distribution of intensity of the received high energy laser beam based on data generated by the at least one camera based on the detected photons.

18. A laser weapon target board apparatus for detecting spatial and temporal intensity distribution of high energy laser beams, comprising:
- a panel made of graphite for receiving a high energy laser beam, the panel having a plurality of openings and a plurality of optical rods made of sapphire and positioned in the plurality of openings, respectively, and configured to allow photons of the received high energy laser beam to be emitted through the plurality of optical rods;
- an optic fiber array positioned substantially parallel to and behind the panel and separated from the panel by a predetermined distance, the optic fiber array including a plurality of rows of optic fiber units and a plurality of columns of optic fiber units, each optic fiber unit being registered to a single corresponding optical rod of the plurality of optical rods and having a tip portion for receiving photons from the plurality of optical rods and a propagation portion having a first end connected to the tip portion and a second end, each optic fiber unit configured to transmit a received photon at the tip portion from the first end of the propagation portion to the second end of the propagation portion, and each optic fiber unit;
- at least one lens configured to receive photons emitted from the second end of the propagation portion of each optic fiber unit of the optic fiber array;
- at least one camera configured to detect the photons emitted from the optic fiber array and passed through the at least one lens;
- an optical filter positioned between the at least one lens and the at least one camera; and
- a processor configured to be connected to the at least one camera and configured to analyze temporal and spatial distribution of intensity of the received high energy laser beam based on data generated by the at least one camera based on the detected photons.

19. The laser weapon target board apparatus of claim 18, wherein each optical rod of the plurality of optical rods has a frosted end for Lambertian scattering on the frosted end and uniform optic distribution to a corresponding optic fiber unit of the optic fiber array.

20. The laser weapon target board apparatus of claim 18, wherein a numerical aperture cone angle of the tip portion of the each optic fiber unit of the optic fiber array covers only photons directly emitted by the single corresponding optical rod of the plurality of optical rods.

* * * * *